(12) United States Patent
Higuchi

(10) Patent No.: US 6,756,574 B2
(45) Date of Patent: Jun. 29, 2004

(54) FOCUSING CONTROL APPARATUS AND METHOD FOR MULTI-LAYER OPTICAL RECORDING MEDIUM

(75) Inventor: Takanobu Higuchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 43 days.

(21) Appl. No.: 10/174,937

(22) Filed: Jun. 20, 2002

(65) Prior Publication Data

US 2002/0195540 A1 Dec. 26, 2002

(30) Foreign Application Priority Data

Jun. 22, 2001 (JP) ........................................ 2001-189600
Jun. 11, 2002 (JP) ........................................ 2002-170484

(51) Int. Cl.[7] ................................................. G11B 7/00
(52) U.S. Cl. ............................. 250/201.2; 250/201.5; 369/44.28
(58) Field of Search ........................ 250/201.2, 201.4, 250/201.5, 214 R, 548; 369/44.25, 44.26, 44.28, 44.32, 44.35, 112.04

(56) References Cited

U.S. PATENT DOCUMENTS 6,172,957 B1 * 1/2001 Ogasawara ................... 369/94

6,307,820 B2 * 10/2001 Takeya et al. ........... 369/44.29

OTHER PUBLICATIONS

Joseph Braat/ Applied Optics/ vol. 36, No. 32/ Analytical Expressions for the Wave–Front Aberration Coefficients of a Tilted Plane–Parallel Plate/ Nov. 10, 1997/ pp. 8459–8466, 8 Pages Total.

* cited by examiner

Primary Examiner—Kevin Pyo
(74) Attorney, Agent, or Firm—McGinn & Gibb, PLLC

(57) ABSTRACT

A focusing control apparatus includes method for an optical pickup having an objective lens and an aberration correcting unit includes the steps of detecting an amount of focus error of a light beam and an amount of aberration of the reflected light beam to generate a focus error value and an aberration value; controlling a focused position of the objective lens on the basis of the focus error value while adjusting an amount of aberration correction of the aberration correcting unit on the basis of the aberration value, and performing a focus jump from one recording layer to another recording layer after adjusting the amount of aberration correction of the aberration correcting unit for the another recording layer.

20 Claims, 9 Drawing Sheets

FOCUSING CONTROL APPARATUS AND METHOD FOR MULTI-LAYER OPTICAL RECORDING MEDIUM

BACKGROUND OF THE INVENTION

1. Field of the Invention

The present invention relates to a focusing control apparatus and method for an optical pickup device which focuses a light beam to be incident on a multi-layer recording medium having a plurality of recording layers and corrects aberration of the light beam reflected from the multi-layer recording medium.

2. Description of the Related Art

A DVD (digital versatile disc) is an optical recording medium which was developed for utilization in recording and reproducing digital data such as computer application programs and data. For example, the DVD having a diameter of approximately 12 centimeters (cm) has a data recording capacity as much as approximately seven times a CD (compact disc) on a single side of the disc. In order to achieve a larger capacity and a higher density of optical disc, it is effective to reduce the wavelength of a light source and increase the numerical aperture (NA) of an objective lens. On the other hand, a multi-layer optical disc having a plurality of recording layers is now under development as an approach for increasing the recording capacity of an optical disc.

It is well known that spherical aberration occurs, during recording or reproduction, due to variations in thickness of a transparent cover layer formed on a recording layer through which a light beam is transmitted. The spherical aberration brings about degradation in recorded or reproduced signal. The amount of spherical aberration occurring with respect to the thickness error of the transparent cover layer is expressed by the following equation, and is disclosed, for example, in J. Bratt, Applied Optics, Vol. 36, No. 32, p 8459 (1997). Particularly, when the numerical aperture of an objective lens is 0.6 or more, higher order aberration cannot be neglected, and up to eighth-order aberration must be taken into consideration.

$$W_{80} = -5(n^6 - 1)NA^8 \cdot \Delta T / 128 n^7 \cdot \lambda$$

where n is the refractive index of the cover layer; NA is the numerical aperture of the objective lens; $\Delta T$ is the thickness error of the cover layer; and $\lambda$ is the wavelength of the light source.

Thus, there is the following problem in a multi-layer optical disc recording/reproducing apparatus which uses an objective lens having a large numerical aperture, particularly, an objective lens having a numerical aperture of 0.8 or more. When a multi-layer disc is recorded or reproduced, a laser light beam is focused on any one of the recording layers, and a signal is recorded on the recording layer or a signal is reproduced from the recording layer while aberration correction is performed. During recording or reproduction a focused position of the irradiated light beam may be changed from one recording layer to another. The movement of the focused position of the irradiation light beam in this manner is generally referred to as "focus jump". When the focus jump is performed, large spherical aberration occurs on the other recording layer, to which the focus is jumped, if an objective lens of a large numerical aperture is used, as is apparent from the aforementioned equation for the amount of aberration. This spherical aberration not only degrades the quality of a recorded or reproduced data signal but also degrades a signal associated with a drive system such as focusing, tracking and so on.

In a conventional algorithm for focusing and aberration correction, a focus pull-in operation is performed onto a recording layer intended for recording or reproduction. Then, acquisition of control information such as focus servo, tracking servo, addresses, and the like is performed. Subsequently, after the spherical aberration is corrected to provide the best address signal and reproduced signal, recording or reproduction is conducted. FIG. 1 shows the intensity of a focus error signal when the focus is jumped to a second recording layer, while the spherical aberration has been corrected for a first recording layer, with respect to the depth from the surface of a disc. As the focused position is moved in the depth direction, the focus error signal exhibits an "S-shaped" characteristic or sigmoid curve with respected to a focus shift. In other words, the focus error signal is generated in the shape of S centered at a focused position (hereinafter, referred to as an S-shaped waveform). In this event, the focusing position of the objective lens is moved while a focus servo loop is open. As illustrated, the S-shaped waveform corresponding to the second recording layer exhibits a small magnitude, and a collapsed waveform is detected. With such an S-shaped waveform, it is difficult to pull-in the focus onto the second recording layer, possibly resulting in a failed focus jump.

OBJECT AND SUMMARY OF THE INVENTION

The present invention has been made in view of the foregoing problem, and it is an object of the invention to provide a focusing control apparatus and method which is capable of performing a reliable focus control for an optical pickup device which has a high NA (numerical aperture) objective lens and an aberration correction capability.

To achieve the object, according to one aspect of the present intention, there is provided a focusing control apparatus for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, the focusing control apparatus comprises a focus error detector which detects an amount of focus error of the light beam from a detection signal of the photodetector to generate a focus error value; an aberration detector which detects an amount of aberration of the reflected light beam from a detection signal of the photodetector to generate an aberration value; and a controller which controls a focused position of the objective lens on the basis of the focus error value while adjusting an amount of aberration correction of the aberration correcting unit on the basis of the aberration value, wherein the controller performs a focus jump from one recording layer to another recording layer after adjusting the amount of aberration correction of the aberration correcting unit for the another recording layer.

According to another aspect of the present invention, there is provided a focusing control apparatus for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, the focusing control apparatus comprises a focus error detector which detects an amount of focus error of the light beam from a detection signal of the photodetector to generate a focus error value; an aberration detector which detects an amount of aberration of the reflected light beam from a detection signal of the photodetector to generate an aberration value; a controller which controls a focused position of the objective lens on the basis of the focus error value while adjusting an amount of aberration correction of the aberration correcting unit on the basis of the aberration value, a calculator which calculates an interlayer distance between one recording layer and another recording layer from a change in the focus error value when a focused position of the objective lens is changed from the one recording layer to the another recording layer; and an estimator which calculates an estimated aberration correction value for the aberration correcting unit when the light beam is focused on the another recording layer using the interlayer distance and an amount of aberration correction of the aberration correcting unit when the light beam is focused on the one recording layer, wherein the controller performs a focus jump from the one recording layer to the another recording layer after adjusting the amount of aberration correction of the aberration correcting unit using the estimated aberration correction value.

According to another aspect of the present invention, there is provided a focusing control apparatus for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, the focusing control apparatus comprises a focus error detector which detects an amount of focus error of the light beam from a detection signal of the photodetector to generate a focus error value; an aberration detector which detects an amount of aberration of the reflected light beam from a detection signal of the photodetector to generate an aberration value; a controller which controls a focused position of the objective lens on the basis of the focus error value while adjusting an amount of aberration correction of the aberration correcting unit on the basis of the aberration value, and a memory which stores an amount of aberration correction when the light beam is focused on each of the plurality of recording layers, wherein the controller performs a focus jump from one recording layer to another recording layer after adjusting the aberration correcting unit with the amount of aberration correction for the another recording layer stored in the memory.

According to another aspect of the present invention, there is provided a focusing control method for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, the method comprises the steps of detecting an amount of focus error of the light beam from a detection signal of the photodetector to generate a focus error value; detecting an amount of aberration of the reflected light beam from a detection signal of the photodetector to generate an aberration value; controlling a focused position of the objective lens on the basis of the focus error value while adjusting an amount of aberration correction of the aberration correcting unit on the basis of the aberration value; and performing a focus jump from one recording layer to another recording layer after adjusting the amount of aberration correction of the aberration correcting unit for the another recording layer.

According to another aspect of the present invention, there is provided a focusing control method for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, the method comprises the steps of detecting an amount of focus error of the light beam from a detection signal of the photodetector to generate a focus error value; detecting an amount of aberration of the reflected light beam from a detection signal of the photodetector to generate an aberration value; controlling a focused position of the objective lens on the basis of the focus error value while adjusting an amount of aberration correction of the aberration correcting unit on the basis of the aberration value, calculating an interlayer distance between one recording layer and another recording layer from a change in the focus error value when a focused position of the objective lens is changed from the one recording layer to the another recording layer; calculating an estimated aberration correction value for the aberration correcting unit when the light beam is focused on the another recording layer using the interlayer distance and an amount of aberration correction of the aberration correcting unit when the light beam is focused on the one recording layer, and performing a focus jump from the one recording layer to the another recording layer after adjusting the amount of aberration correction of the aberration correcting unit using the estimated aberration correction value.

According to another aspect of the present invention, there is provided a focusing control apparatus for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, the focusing control apparatus comprises a focus error detector which detects an amount of focus error of the light beam from a detection signal of the photodetector to generate a focus error value; an aberration detector which detects an amount of aberration of the reflected light beam from a detection signal of the photodetector to generate an aberration value; a controller which controls a focused position of the objective lens on the basis of the focus error value while adjusting an amount of aberration correction of the aberration correcting unit on the basis of the aberration value, a calculator which calculates an interlayer distance between one recording layer and another recording layer from a change in the focus error value when a focused position of the objective lens is changed from the one recording layer to the another recording layer; and an estimator which calculates an estimated aberration correction value for the aberration correcting unit when the light beam is focused on the another recording layer using the interlayer distance and an aberration correction value of the aberration correcting unit when the light beam is focused on the one recording layer, wherein the controller performs a focus jump from the one recording layer to the another recording layer after adjusting the amount of aberration correction of the aberration correcting unit to be an intermediate value between the aberration correction value for the one recording layer and the estimated aberration correction value for the another recording layer.

According to another aspect of the present invention, there is provided a focusing control method for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, the method comprises the steps of detecting an amount of focus error of the light beam from a detection signal of the photodetector to generate a focus error value; detecting an amount of aberration of the reflected light beam from a detection signal of the photodetector to generate an aberration value; controlling a focused position of the objective lens on the basis of the focus error value while adjusting an amount of aberration correction of the aberration correcting unit on the basis of the aberration value, calculating an interlayer distance between one recording layer and another recording layer from a change in the focus error value when a focused position of the objective lens is changed from the one recording layer to the another recording layer; calculating an estimated aberration correction value for the aberration correcting unit when the light beam is focused on the another recording layer using the interlayer distance and an aberration correction value of the aberration correcting unit when the light beam is focused on the one recording layer, performing a focus jump from the one recording layer to the another recording layer after adjusting the amount of aberration correction of the aberration correcting unit to be an intermediate value between the aberration correction value for the one recording layer and the estimated aberration correction value for the another recording layer.

DETAILED DESCRIPTION OF THE PREFERRED EMBODIMENTS

In the following, embodiments of the present invention will be described in detail with reference to the drawings.

First Embodiment

Figure 1:
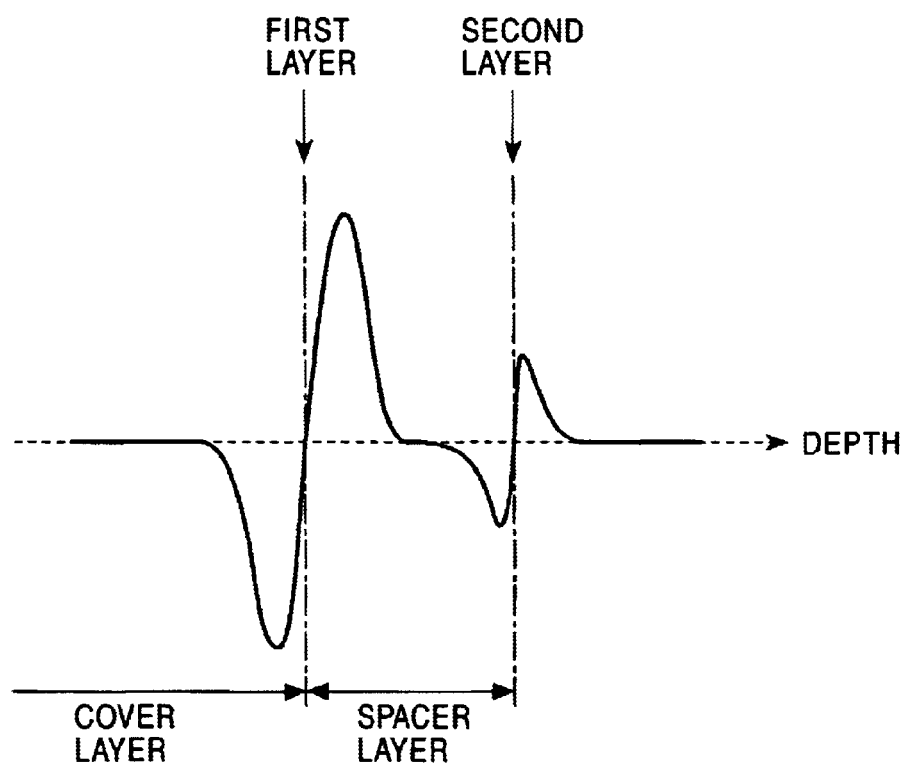
FIG. 1 is a diagram showing the intensity of a focus error signal with respect to the depth from the surface of a disc, when the focus is jumped to a second recording layer while the spherical aberration correction is adjusted for a first recording layer.
Figure 2:
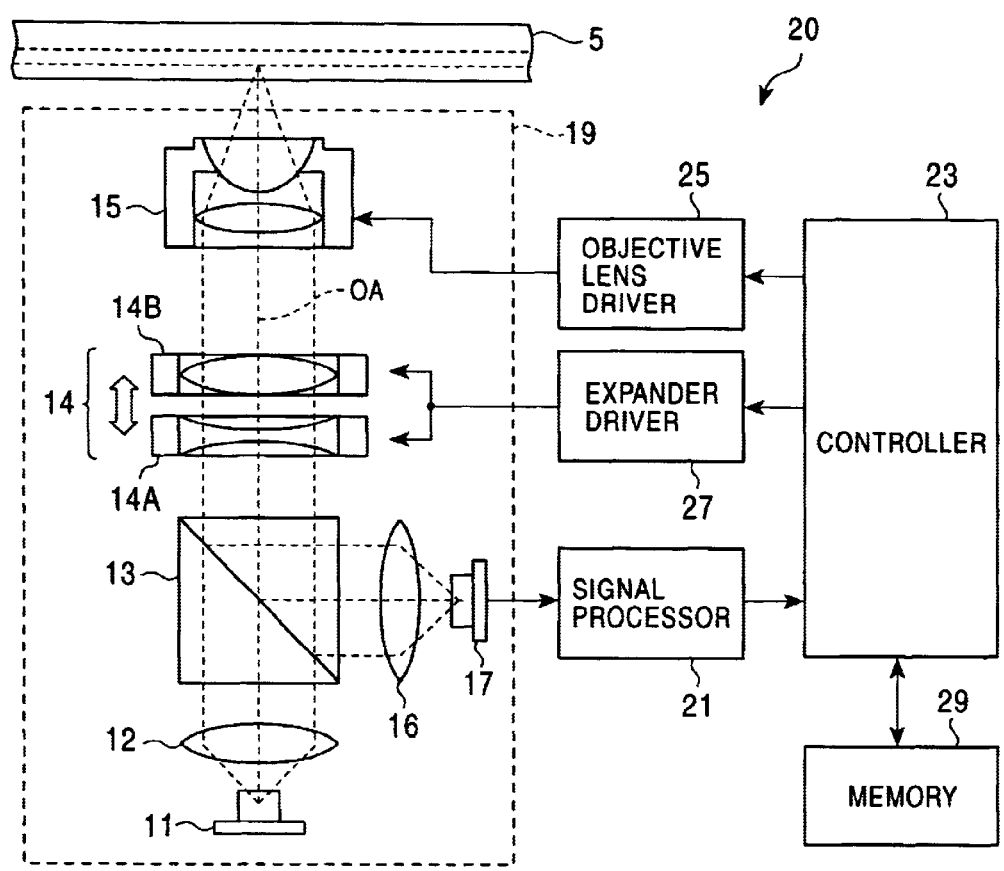
FIG. 2 is a block diagram illustrating the configuration of a focusing control apparatus according to a first embodiment of the present invention.

FIG. 2 is a block diagram illustrating the configuration of a focusing control apparatus 20 according to a first embodiment of the present invention.

A laser light source 11 provided in an optical pickup device 19 emits laser light, for example, at wavelength λ of 400 nanometer (nm). A laser beam emitted from the laser light source 11 is transformed into a collimated light beam by a collimator lens 12. The collimated light beam is converged by an objective lens 15 and made incident on an optical disc 5 after passing through a beam splitter 13 and an aberration correcting unit 14. The incident light beam is reflected by the optical disc 5, converged by the objective lens 15, and detected by a photodetector 17 after passing through the aberration correcting unit 14 and beam splitter 13.

The aberration correcting unit 14 is a beam expander comprised of two lenses for correcting spherical aberration. The beam expander is provided with a beam expander actuator (not shown). The beam expander actuator includes a voice coil motor, a piezoelectric element, a motor or the like, to change the positions of the two lenses according to a supplied current or a supplied voltage. In this way, the beam expander actuator can adjust an amount of aberration correction of the aberration correcting unit 14.

The objective lens 15 has a numerical aperture NA of 0.8, and the objective lens 15 is provided with an objective lens actuator (not shown). The objective lens actuator includes, for example, a plurality of leaf springs, and a voice coil.

The photodetector 17 detects reflected light to convert the detected light into an electric signal. The detected signal is supplied to a signal processing circuit 21. The signal processing circuit 21 generates read signals such as a data signal, an address information signal recorded on a recording layer and also generates error signals such as a focus error signal (FE), a tracking error signal (TE), and the like. These error signals (FE, TE, etc.) are supplied to a controller 23. The controller 23 operates the objective lens actuator through an objective lens driver 25 based on the error signals to drive the objective lens 15, thereby forming a servo loop for focusing, tracking control and the like to conduct a servo control. The controller 23 also performs a focus jump for changing a focused position of the light beam between recording layers.

The controller 23 estimates an aberration correction amount or value based on the read signals supplied from the signal processing circuit 21. For example, the estimated aberration correction value may be calculated using the envelope amplitude of a read RF signal. The controller 23 drives the aberration correcting unit 14 through an expander driver 27 in accordance with the estimated aberration correction value to perform an aberration correction control.

The controller 23 is connected to a memory 29 for storing the aberration correction amount for the aberration correcting unit 14, estimated aberration correction value, a various kinds of data including an interlayer distance, S-shaped waveform intensity, reference values, threshold values, parameter values, and the like.

Figure 3:
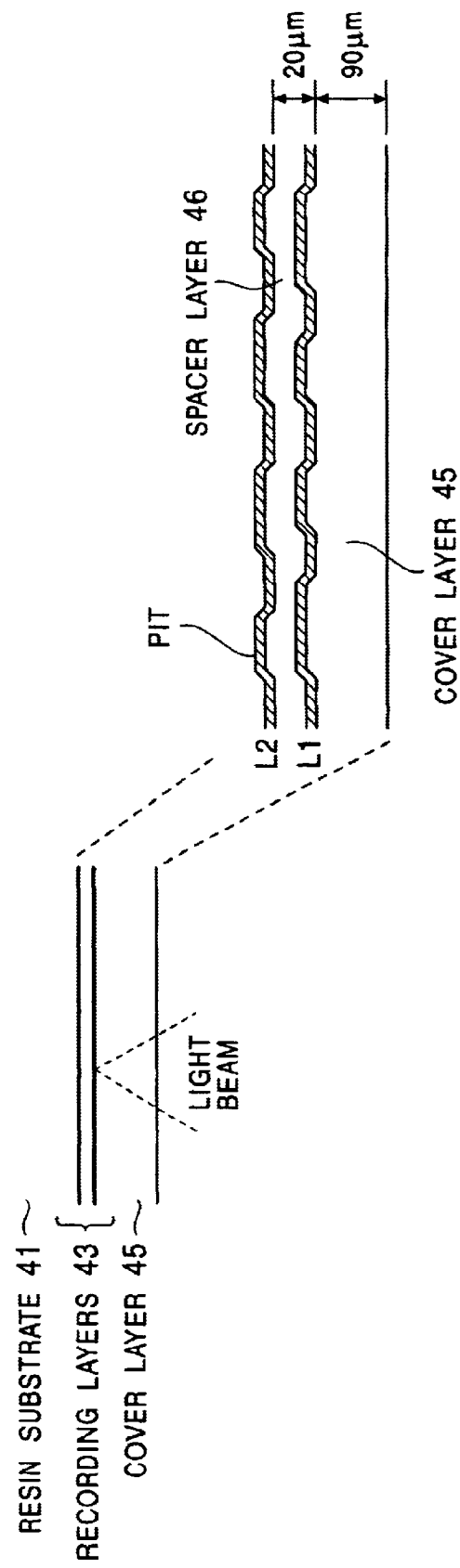
FIG. 3 is a cross-sectional view schematically illustrating the structure of un optical disc having two recording layers.

FIG. 3 is a cross-sectional view schematically illustrating the structure of the multi-layer optical disc 5, particularly, a portion of recording layers in an enlarged view.

An optical disc 5 comprises a resin substrate 41, made of polycarbonate or the like and having a diameter of 120 mm and a thickness of 1.1 mm; two recording layers (L1, L2) 43; and a cover layer 45. A spacer layer 46 is formed between the first and second recording layers L1, L2 (reflective layers). The spacer layer 46 is made of a photo-curable resin and having a thickness of approximately 20 μm. The spacer layer 46 serves as a spacer for separating the two recording layers from each other, and is formed with microscopic pits and projections on the surface in a spiral or concentric manner for carrying information data. The first and second recording layers L1, L2 are mainly made, for example, of silver and aluminum, respectively. The cover layer 45 is made of a transparent resin in a thickness of approximately 90 μm for protecting the recording layers. A light beam is made incident on the recording layers through the cover layer 45.

On the recording layers L1, L2 is recorded a digital signal which is modulated in accordance with (1, 7) modulation. A pit train, constituting information data, is formed such that a minimum pit length is 0.159 μm, and a track pitch is 0.3 μm. In this instance, a recording capacity per layer is 25 GB.

Figure 4:
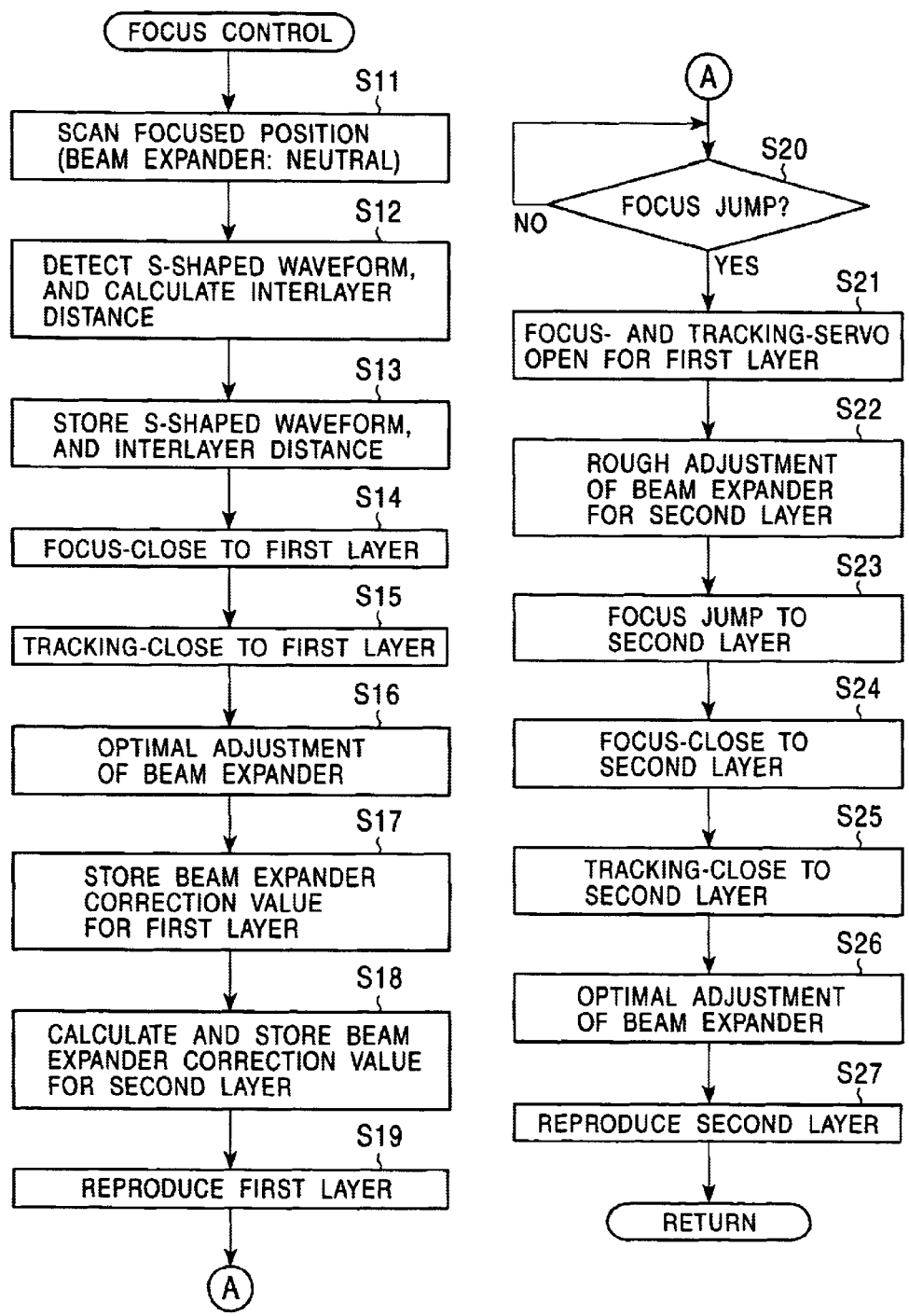
FIG. 4 is a flow chart illustrating a focus control procedure in the focusing control apparatus in the first embodiment of the present invention.

Then, a focus conducted by the controller 23 will be described with reference to a flow chart illustrated in FIG. 4.

As the optical disc 5 is loaded into a recording/reproducing apparatus having the focusing control apparatus 20, a spindle, motor actuates to rotate the optical disc 5, and the optical pickup 19 moves toward the inner radius of the disc. Subsequently, the controller 23 drives the objective lens 15 in the direction of the optical axis of a light beam at a predetermined speed to scan a focused position (step S11). In this event, the beam expander associated with the aberration correcting unit 14 is set at a neutral position within a driving range. The neutral position may be set as a predetermined position, or as a position corresponding to an intermediate value of an aberration correction amount which has been previously calculated for each recording layer.

The controller 23 detects S-shaped waveforms of the focus error signal corresponding to the recording layers L1, L2 by scanning the focused position to calculate an optical length from the zero-cross points of the waveforms. The controller 23 calculates an interlayer distance using the refractive index of the spacer layer 46 (step S12). The interlayer distance is defined as an optical distance obtained by multiplying the physical distance by an optical constant of the interlayer medium. The resulting S-shaped waveforms and the interlayer distance are stored in the memory 29 (step S13).

The controller 23, then, drives the objective lens actuator to perform focus pull-in onto the first recording layer L1. After a focus-close (focusing-servo-close) operation is completed (step S14), the controller 23 performs tracking pull-in based on a tracking error signal. After a tracking-close (tracking-servo-close) operation is completed (step S15), the controller 23 changes the positions of the two lenses constituting the beam expander to maximize the envelope amplitude to correct aberration (step S16). A correction value (i.e., a voltage value, a current value or the like) applied to the beam expander when the spherical aberration is optimally corrected for the first recording layer L1 is stored in the memory 25 (step S17). In this event a deviation from the designed thickness value of the cover layer can be known using the correction value for the beam expander. In other words, the thickness of the cover layer can be calculated by subtracting the deviation from the designed value. It should be noted however that the calculated value is not an absolute value but a value which includes aberration inherent to the pickup. Alternatively, the focus position may be scanned from the outside of the optical disc 5 to the first recording layer to detect an S-shaped waveform corresponding to a position on the surface of the optical disc 5 and an S-shaped waveform corresponding to the first recording layer, thereby calculating the thickness of the over layer.

The controller 23 calculates an estimate of the beam expander correction value for the second recording layer L2 using the interlayer distance, and stores the estimated value in the memory 29 (step S18). The controller 23 performs an operation for reproducing the first recording layer L1 (step S19). The controller 23 determines whether or not a focus jump is to be performed (step S20). The controller 23 makes the focus and tracking servo open for the first recording layer L1 when it is determined that the focus jump is to be performed (step S21). The controller 23 adjusts (rough adjustment) the beam expander for the second recording layer L2 using the beam-expander correction estimate (step S22). Subsequently, the controller 23 drives the objective lens actuator to perform the focus jump to focus the light beam on the second recording layer L2 (step S23).

Figure 5:
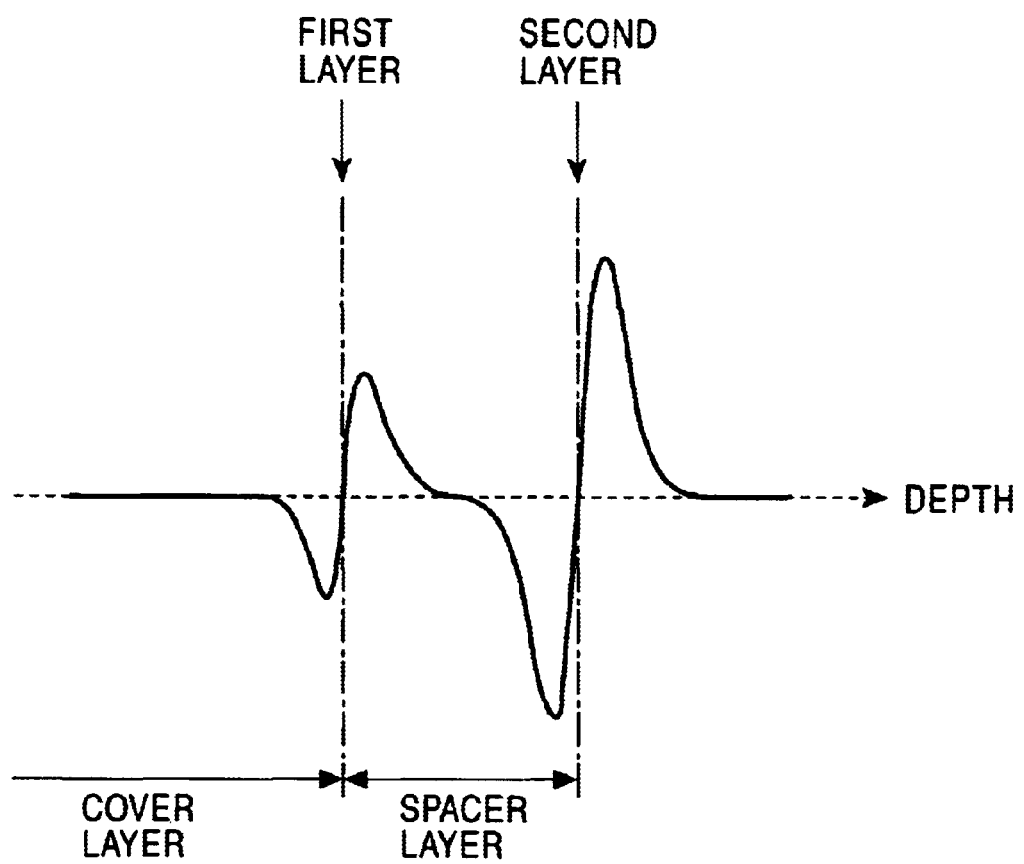
FIG. 5 is a diagram schematically showing an S-shaped waveform corresponding to a first and a second recording layer when a focus jump is performed in accordance with the procedure illustrated in FIG. 4.

FIG. 5 shows the S-shaped waveforms corresponding to the first and second recording layers. The S-shaped waveform corresponding to the second recording layer is large in magnitude and has a favorable waveform, so that the focus pull-in can be favorably performed on the second recording layer.

In a similar manner to the first recording layer L1, the controller 23 performs a focus pull-in and tracking pull-in operation for the second recording layer L2 (steps S24, S25). After the operation is completed, the controller 23 adjusts the beam expander so as to optimize a correction of spherical aberration (step S26). Then, the controller 23 performs an operation for reproducing the second recording layer L2 (step S27), followed by termination operation of the focus jump control.

The foregoing procedure enables the focus jump to be reliably performed even with an optical pickup using a high NA objective lens.

The present invention can be readily extended for application in a multi-layer disc having three or more or recording layers, not limited to a two-layer disc.

Second Embodiment

A second embodiment of the present invention will be described below. The focusing control apparatus 20 is identical in configuration to that in the first embodiment.

Figure 6:
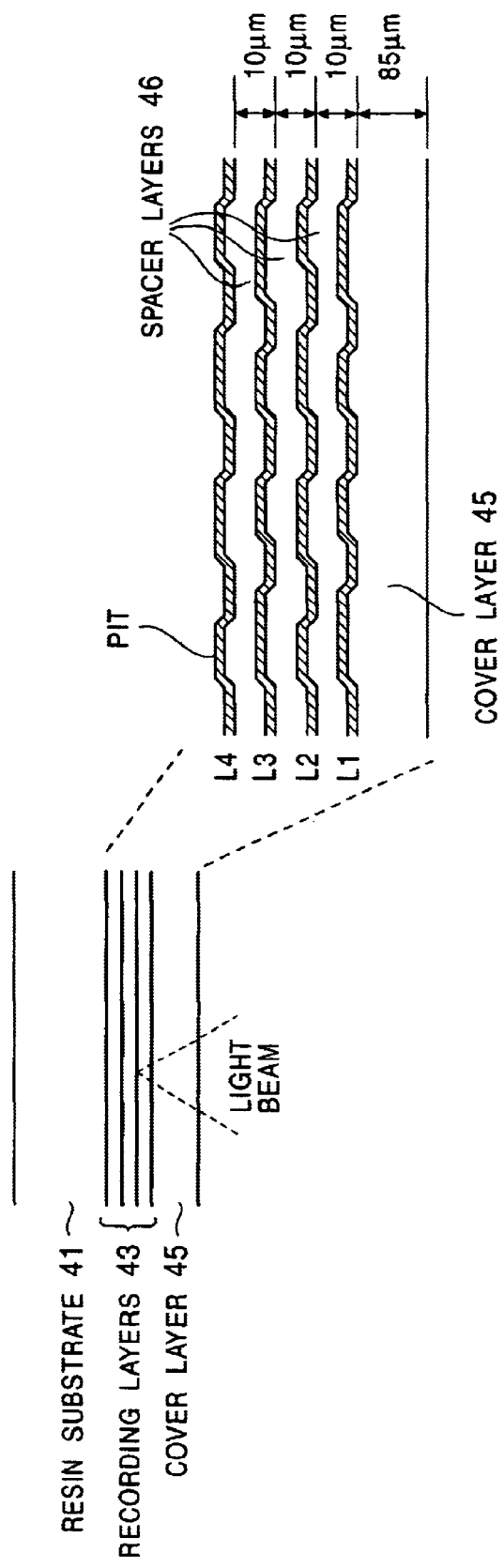
FIG. 6 is a cross-sectional view schematically illustrating the structure of an optical disc having four recording layers according to a second embodiment of the present invention.

FIG. 6 is a cross-sectional view illustrating the structure of an optical disc 5 of the second embodiment, particularly, a portion of recording layers in an enlarged view. Specifically, FIG. 6 illustrates an optical disc having four recording layers exclusive for reproduction as an example.

The optical disc 5 comprises a resin substrate 41 made of polycarbonate or the like and having a diameter of 120 mm and a thickness of 1.1 mm; four recording layers (L1–L4) 43; and a cover layer 45. There are formed spacer layers 46 between the respective adjacent recording layers L1–L4 (reflective layers). The spacer layers 46 are each made of a photo-curable resin and having a thickness of approximately 20 μm. Each of the spacer layers 46 serves as a spacer for separating two recording layers from each other, and is formed with microscopic pits and projections on the surface in a spiral or concentric manner for carrying information data. The first and second recording layers L1, L2 are mainly made, for example, of titanium oxide; the second recording layer L3 of silver; and the recording layer L4 of aluminum. The cover layer 45 is made of a transparent resin in a thickness of approximately 85 μm for protecting the recording layers. A light beam is made incident on the recording layer through the cover layer 45.

Figure 7:
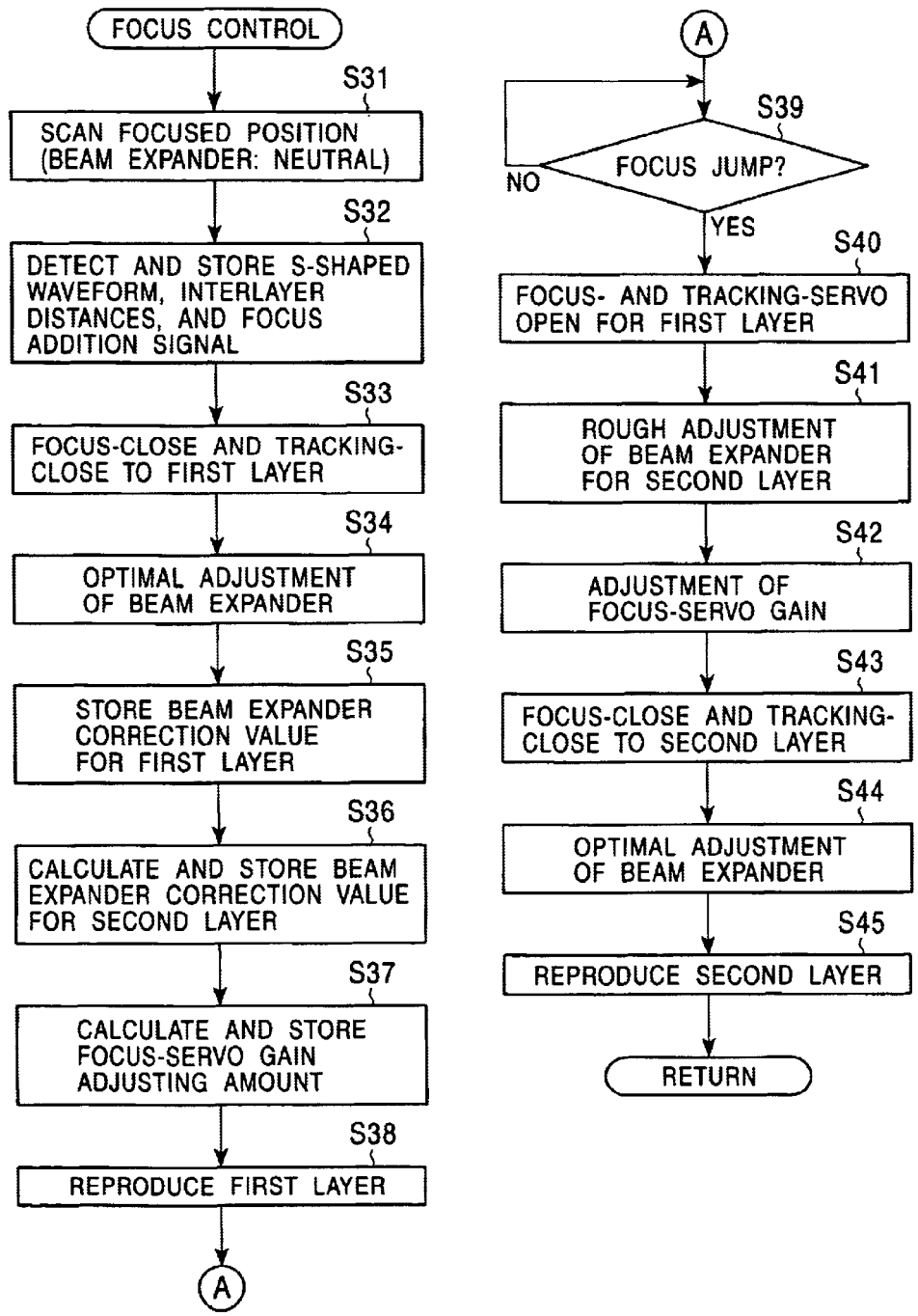
FIG. 7 is a flow chart illustrating a focus control procedure in the second embodiment of the present invention.

A focus control conducted by the controller 23 will be described with reference to a flow chart illustrated in FIG. 7.

In a manner similar to the first embodiment, the controller 23 scans a focusing position of the objective lens 15 (step S31) to detect and store an S-shaped waveform related to the respective recording layers L1–L4, and the interlayer distances. Further, in the second embodiment, the controller 23 also detects and stores focus addition signals related to the respective recording layers L1–L4 (step S32). The focus addition signal is a full light-receiving signal of the photodetector 17. When the photodetector 17 is, for example, a quadrant detector comprised of four light receiving elements, the focus addition signal is a sum signal of the detection signals from all (i.e., four) the light receiving elements. Differences in reflectivities among the respective recording layers can be detected using the focus addition signals.

While the second embodiment can be applied when the focus is jumped between two arbitrary recording layers among the four recording layers (L1–L4), an example will be given below for a focus jump from the first recording layer L1 to the second recording layer L2 for brevity of description.

After completing focus-close and tracking-close operation on the first recording layer L1 (step S33), the controller 23 optimizes an aberration correction for the beam expander (step S34). The controller 23 stores a beam expander correction value in the memory 29 when the spherical aberration is optimally corrected for the first recording layer L1 (step S35).

The controller 23 calculates a beam-expander correction estimate for the second recording layer L2 using the interlayer distance, and stores the estimated value (step S36). Further, in the second embodiment, the controller 23 calculates the ratio of reflectivities of the recording layers using the focus addition signal, and calculates and stores an adjustment amount of a focus servo gain for the second recording layer L2 when a focus jump is performed in accordance with the ratio (step S37).

Then, the controller performs an operation for reproducing the first recording layer L1 (step S38). Then, the controller 23 determines whether or not a focus jump is to be performed (step S39), and makes the focus and tracking servos open for the first recording layer L1 when it is determined that the focus jump is to be performed (step S40). The controller 23 adjusts (rough adjustment) the beam expander for the second recording layer L2 using the beam-expander correction estimate (step S41). Further, the controller 23 adjusts the gain for the second recording layer L2 based on a focus-servo gain adjustment amount (step S42).

Then, the controller 23 performs the focus pull-in and tracking pull-in operation for the second recording layer L2, and upon completing them (step S43) adjusts the beam expander so as to optimize a correction for spherical aberration (step 544). The controller 23 performs an operation for reproducing the second recording layer L2 (step S45), followed by termination of the focus jump control. The foregoing procedure can ensure the focus control.

It should be understood that the present invention can be readily extended for application in a multi-layer disc, not limited to a four-layer disc.

Third Embodiment

A third embodiment of the present invention will be described below. The focusing control apparatus 20 is identical in configuration to that of the first or second embodiment.

Figure 8:
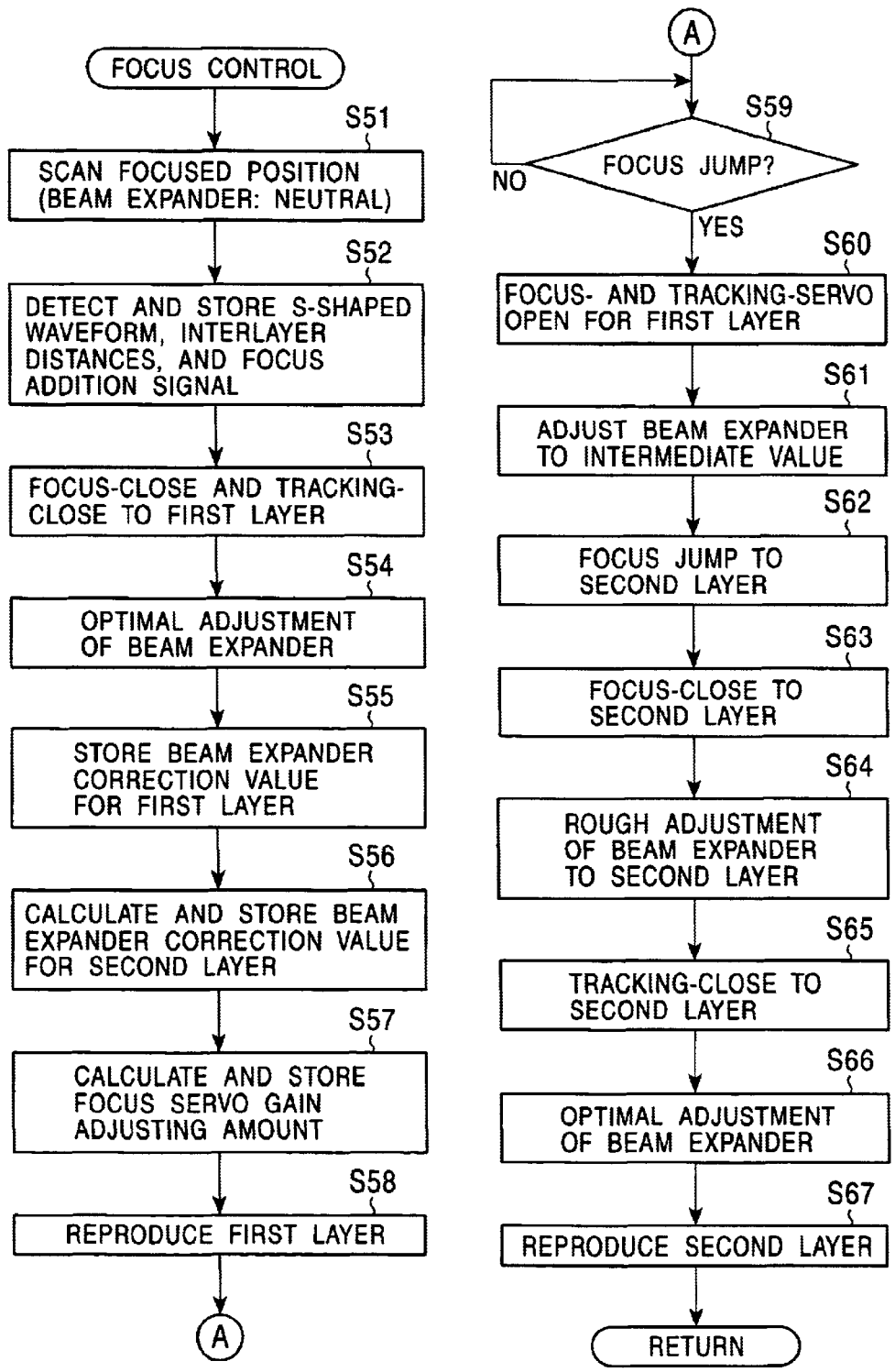
FIG. 8 is a flow chart illustrating a focus control procedure executed by a controller 23 in the third embodiment of the present invention.

FIG. 8 is a flow chart illustrating a focus control procedure executed by a controller 23 in the third embodiment of the present invention.

In a manner similar to the first or second embodiment, the controller 23 scans a focusing position of the objective lens 15 (step S51) to detect and store an S-shaped waveform related to the respective recording layers L1–L4, and the interlayer distances. Further, in the third embodiment, the controller 23 also detects and stores focus addition signals related to the respective recording layers L1–L4 (step S52). The focus addition signal is a full light-receiving signal of the photodetector 17. When the photodetector 17 is, for example, a quadrant detector comprised of four light receiving elements, the focus addition signal is a sum signal of the detection signals from all the light receiving elements (i.e., four receiving elements). Differences in reflectivities among the respective recording layers can be detected using the focus addition signals.

While the third embodiment can be applied when the focus is jumped between two arbitrary recording layers among the four recording layers (L1–L4), an example will be given below for a focus jump from the first recording layer L1 to the second recording layer L2 for brevity of description.

After completing focus-close and tracking-close operation on the first recording layer L1 (step S53), the controller 23 optimizes an aberration correction for the beam expander (step S54). The controller 23 performs a control to store a beam expander correction value in the memory 29 when the spherical aberration is optimally corrected for the first recording layer L1 (step S55).

The controller 23 calculates a beam expander correction estimate for the second recording layer L2 using the interlayer distance, and stores the estimated correction value (step S56). Further, in the third embodiment, the controller 23 calculates the ratio of reflectivities of the recording layers using the focus addition signals, and calculates and stores an adjustment amount of a focus servo gain for the second recording layer L2 when a focus jump is performed in accordance with the ratio (step S57).

Then, the controller performs an operation for reproducing the first recording layer L1 (step S58). Then, the controller 23 determines whether or not a focus jump is to be performed (step S59), and makes the focus and tracking servos open for the first recording layer L1 when it is determined that the focus jump is to be performed (step S60). The controller 23 adjusts the beam expander correction value to be an intermediate value, preferably to be approximately a center value, between the correction values for the first recording layer L1 and the estimated correction value for the second recording layer L2 stored in the memory 29 (step S61). In other words, the beam expander correction value need not precisely be the center value since there is a tolerance (at least ±10%) for the adjustment. Specifically, the reflectivity of a recording layer of a two-layer DVD disc is specified to be in the range of 18% to 30%. This means that the reflectivity within two-times difference (i.e., reflection intensity difference within 6 dB) can be tolerable in designing a disc drive. Therefore, the disc drive can be operated well when the difference of the reflected light intensities is within 6 dB, even if the S-shaped waveform intensities are not the same.

Then, the controller 23 performs a focus-jump by focusing to the second recording layer L2 through driving the objective lens actuator (step S62).

Figure 9:
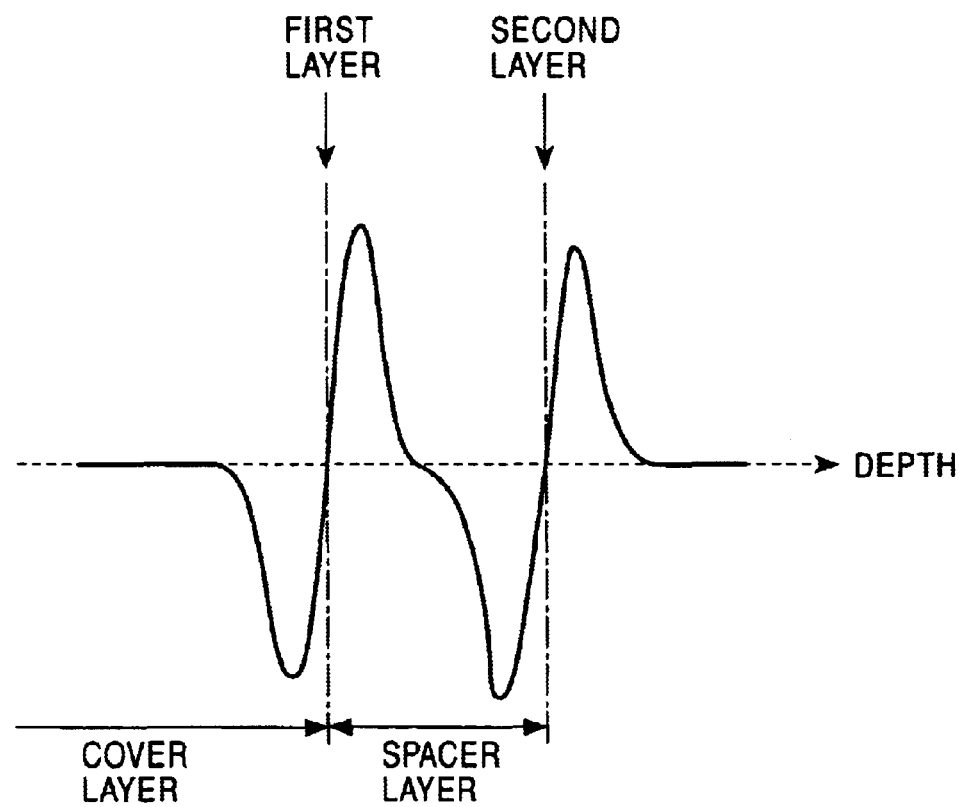
FIG. 9 shows the S-shaped waveforms corresponding to the first and second recording layers.

FIG. 9 shows the S-shaped waveforms corresponding to the first and second recording layers. The S-shaped waveform corresponding to the first and second recording layer is large enough in magnitude and has a favorable waveform, so that the focus pull-in can be favorably performed on the second recording layer.

The controller 23 performs a focus pull-in operation for the second recording layer L2 (step S63), and upon completion, adjusts (i.e., rough adjustment) the beam expander using the estimated beam-expander correction value (step S64).

Then, the controller 23 performs the tracking pull-in operation for the second recording layer L2 (step S65), and upon completion, adjusts the beam expander so as to optimize a correction for spherical aberration (step S66). Thus, the focus jump control is terminated and the controller 23 performs an operation for reproducing the second recording layer L2 (step S67).

The foregoing procedure can ensure the focus control. It should be understood that the present invention can be readily extended for application in a multl-layer disc, not limited to a four-layer disc.

In the third embodiment, the beam-expander correction value is adjusted preferably to be approximately a center value of the correction values for the two recording layers. This makes it possible for focusing control to focus back to the first recording layer L1 when a focus-jump from the first recording layer L1 to the second recording layer L2 is failed. Otherwise, focusing collapse or focusing breakdown takes place and the focusing control must be initialized for restoration. Therefore, according to the present invention, the focusing collapse can be avoided.

As described above in detail, a reliable focus control can be conducted for a multi-layer disc having a high recording density even using an optical pickup device which has a high NA objective lens.

With a multl-layer disc having three or more recording layers, the foregoing operation need not be performed for focus jumps among all recording layers. It is also within a range of design that the foregoing operation is performed as appropriate only for recording layers between which a focus jump is performed. Also, the interlayer distance and/or reflectivity need not be measured for all recording layers, but the measurements may be made only for some of recording layers. Further, in this case, the interlayer distance and/or reflectivity may be calculated or estimated for other recording layers, for which the measurements have not been made, by extrapolation using measured values for the recording layers, or by using other algorithms.

While the foregoing embodiment has been described in connection with an aberration correcting unit comprising a beam expander taken as an example, the present invention is not limited to the unit. For example, the present invention may be applied to the device having an aberration correcting element utilizing an electro-optical effect such as liquid crystal.

As described above in detail, according to the present invention, a high-performance focusing control apparatus and method can be provided. The focusing control apparatus and method provides a capability of performing a reliable focus control for an optical pickup device which has a high NA (numerical aperture) objective lens and an aberration correction The invention has been described with reference to the preferred embodiments thereof. It should be understood by those skilled in the art that a variety of alterations and modifications may be made from the embodiments described above. It is therefore contemplated that the appended claims encompass all such alterations and modifications.

This modification is based on Japanese Patent Applications Nos. 2001-189600 and 2002-170484 which are hereby incorporated by reference.

What is claimed is:

1. A focusing control apparatus for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, said focusing control apparatus comprising:

a focus error detector which detects an amount of focus error of the light beam from a detection signal of said photodetector to generate a focus error value;

an aberration detector which detects an amount of aberration of the reflected light beam from a detection signal of said photodetector to generate an aberration value; and a controller which controls a focused position of said objective lens on the basis of said focus error value while adjusting an amount of aberration correction of said aberration correction unit on the basis of said aberration value, wherein said controller performs a focus jump from one recording layer to another recording layer after adjusting the amount of aberration correction of said aberration correcting unit for said another recording layer.

2. A focusing control apparatus for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, said focusing control apparatus comprising:

a focus error detector which detects an amount of focus error of the light beam from a detection signal of said photodetector to generate a focus error value;

an aberration detector which detects an amount of aberration of the reflected light beam from a detection signal of said photodetector to generate an aberration value;

a controller which controls a focused position of said objective lens on the basis of said focus error value while adjusting an amount of aberration correction of said aberration correcting unit on the basis of said aberration value, a calculator which calculates an interlayer distance between one recording layer and another recording layer from a change in said focus error value when a focused position of said objective lens is changed from said one recording layer to said another recording layer; and an estimator which calculates an estimated aberration correction value for said aberration correcting unit when the light beam is focused on said another recording layer using said interlayer distance and an amount of aberration correction of said aberration correcting unit when the light beam is focused on said one recording layer, wherein said controller performs a focus jump from said one recording layer to said another recording layer after adjusting the amount of aberration correction of said aberration correcting unit using said estimated aberration correction value.

3. A focusing control apparatus according to claim 2, wherein said calculator further calculates a ratio of magnitudes between reflected lights from said one recording layer and said another recording layer, and said controller performs servo control for the focused position of said objective lens to adjust, prior to said focus jump, a servo gain of the servo control in accordance with the ratio of magnitudes between the reflected lights.

4. A focusing control apparatus according to claim 1, wherein said objective lens has a numerical aperture of 0.8 or more.

5. A focusing control apparatus for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, said focusing control apparatus comprising:
- a focus error detector which detects an amount of focus error of the light beam from a detection signal of said photodetector to generate a focus error value;
- an aberration detector which detects an amount of aberration of the reflected light beam from a detection signal of said photodetector to generate an aberration value;
- a controller which controls a focused position of said objective lens on the basis of said focus error value while adjusting an amount of aberration correction of said aberration correcting unit on the basis of said aberration value, and
- a memory which stores an amount of aberration correction when the light beam is focused on each of said plurality of recording layers,
- wherein said controller performs a focus jump from one recording layer to another recording layer after adjusting said aberration correcting unit with the amount of aberration correction for said another recording layer stored in said memory.

6. A focusing control apparatus according to claim 5, wherein said calculator further calculates a ratio of magnitudes between reflected lights from said one recording layer and said another recording layer, and said controller performs servo control for the focused position of said objective lens to adjust, prior to said focus jump, a servo gain of the servo control in accordance with the ratio of magnitudes between the reflected lights.

7. A focusing control method for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, the method comprising:
- detecting an amount of focus error of the light beam from a detection signal of said photodetector to generate a focus error value;
- detecting an amount of aberration of the reflected light beam from a detection signal of said photodetector to generate an aberration value;
- controlling a focused position of said objective lens on the basis of said focus error value while adjusting an amount of aberration correction of said aberration correcting unit on the basis of said aberration value, and
- performing a focus jump from one recording layer to another recording layer after adjusting the amount of aberration correction of said aberration correcting unit for said another recording layer.

8. A focusing control method for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, the method comprising:
- detecting an amount of focus error of the light beam from a detection signal of said photodetector to generate a focus error value;
- detecting an amount of aberration of the reflected light beam from a detection signal of said photodetector to generate an aberration value;
- controlling a focused position of said objective lens on the basis of said focus error value while adjusting an amount of aberration correction of said aberration correcting unit on the basis of said aberration value,
- calculating an interlayer distance between one recording layer and another recording layer from a change in said focus error value when a focused position of said objective lens is changed from said one recording layer to said another recording layer;
- calculating an estimated aberration correction value for said aberration correcting unit when the light beam is focused on said another recording layer using said interlayer distance and an amount of aberration correction of said aberration correcting unit when the light beam is focused on said one recording layer, and
- performing a focus jump from said one recording layer to said another recording layer after adjusting the amount of aberration correction of said aberration correcting unit using said estimated aberration correction value.

9. A method according to claim 8, further comprising:
- calculating a ratio of magnitudes between reflected lights from said one recording layer and said another recording layer; and
- performing servo control for the focused position of said objective lens to adjust, prior to said focus jump, a servo gain of the servo control in accordance with the ratio of magnitudes between the reflected lights.

10. A focusing control apparatus for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, said focusing control apparatus comprising:
- a focus error detector which detects an amount of focus error of the light beam from a detection signal of said photodetector to generate a focus error value;
- an aberration detector which detects an amount of aberration of the reflected light beam from a detection signal of said photodetector to generate an aberration value;
- a controller which controls a focused position of said objective lens on the basis of said focus error value while adjusting an amount of aberration correction of said aberration correcting unit on the basis of said aberration value,
- a calculator which calculates an interlayer distance between one recording layer and another recording layer from a change in said focus error value when a focused position of said objective lens is changed from said one recording layer to said another recording layer; and an estimator which calculates an estimated aberration correction value for said aberration correcting unit when the light beam is focused on said another recording layer using said interlayer distance and an aberration correction value of said aberration correcting unit when the light beam is focused on said one recording layer, wherein said controller performs a focus jump from said one recording layer to said another recording layer after adjusting the amount of aberration correction of said aberration correcting unit to be an intermediate value between the aberration correction value for said one recording layer and the estimated aberration correction value for said another recording layer.

11. A focusing control apparatus according to claim 10, wherein said controller performs a focus jump from said one recording layer to said another recording layer after adjusting the amount of aberration correction of said aberration correcting unit to be approximately a center value of the aberration correction value for said one recording layer and the estimated aberration correction value for said another recording layer.

12. A focusing control method for an optical pickup which includes an objective lens for focusing a light beam on a recording layer of a multi-layer recording medium having a plurality of recording layers, an aberration correcting unit for correcting aberration of a reflected light beam from the recording layer, and a photodetector for receiving the reflected light beam, the method comprising:

detecting an amount of focus error of the light beam from a detection signal of said photodetector to generate a focus error value;

detecting an amount of aberration of the reflected light beam from a detection signal of said photodetector to generate an aberration value; controlling a focused position of said objective lens on the basis of said focus error value while adjusting an amount of aberration correction of said aberration correcting unit on the basis of said aberration value, calculating an interlayer distance between one recording layer and another recording layer from a change in said focus error value when a focused position of said objective lens is changed from said one recording layer to said another recording layer;

calculating an estimated aberration correction value for said aberration correcting unit when the light beam is focused on said another recording layer using said interlayer distance and an aberration correction value of said aberration correcting unit when the light beam is focused on said one recording layer, performing a focus jump from said one recording layer to said another recording layer after adjusting the amount of aberration correction of said aberration correcting unit to be an intermediate value between the aberration correction value for said one recording layer and the estimated aberration correction value for said another recording layer.

13. A focusing control method according to claim 12, wherein performing a focus jump comprises performing a focus jump from said one recording layer to said another recording layer after adjusting the amount of aberration correction of said aberration correcting unit to be approximately a center value of the aberration correction value for said one recording layer and the estimated aberration correction value for said another recording layer.

14. The apparatus of claim 1, further comprising a calculator that calculates an interlayer distance between said one recording layer and said another recording layer based on a change in focus error when a focused position of said objective lens is changed from said one recording layer to said another recording layer.

15. The apparatus of claim 14, further comprising an estimator which calculates an estimated aberration correction value for said aberration correcting unit when the light beam is focused on said another recording layer using said interlayer distance and an amount of aberration correction of said aberration correcting unit when the light beam is focused on said one recording layer, wherein said controller adjusts the amount of aberration correction using said estimated aberration correction value.

16. The apparatus of claim 14, wherein said calculator further calculates a ratio of magnitudes between reflected lights from said one recording layer and said another recording layer.

17. The apparatus of claim 16, wherein said controller performs servo control for the focused position of said objective lens to adjust a servo gain of the servo control in accordance with the ratio of magnitudes between the reflected lights prior to said focus jump.

18. The method of claim 7, further comprising calculating an interlayer distance between said one recording layer and said another recording layer from a change in said focus error when a focused position of said objective lens is changed from said one recording layer to said another recording layer.

19. The method of claim 18, further comprising calculating an estimated aberration correction value for said aberration correcting unit when the light beam is focused on said another recording layer using said interlayer distance and an amount of aberration correction of said aberration correcting unit when the light beam is focused on said one recording layer, wherein said adjusting of said aberration correction comprises using said estimated aberration correction value.

20. The method of claim 7, further comprising calculating a ratio of magnitudes between reflected lights from said one recording layer and said another recording layer, and performing servo control for the focused position of said objective lens to adjust a servo gain of the servo control in accordance with the ratio of magnitudes between the reflected lights prior to said focus jump.

* * * * *